United States Patent [19]

Heimann et al.

[11] Patent Number: 4,827,538

[45] Date of Patent: May 9, 1989

[54] MIXING FIXTURE FOR FLEXIBLE-PIPE SPRAY HEAD

[75] Inventors: Bruno Heimann, Frödenberg-Ardey; Rainer Luke; Heinz-Dieter Eichholz, both of Iserlohn, all of Fed. Rep. of Germany

[73] Assignee: Friedrich Grohe Armaturenfabrik Gmbh & Co., Hemer, Fed. Rep. of Germany

[21] Appl. No.: 11,167

[22] Filed: Feb. 5, 1987

[30] Foreign Application Priority Data

Feb. 5, 1986 [DE] Fed. Rep. of Germany ....... 3603503

[51] Int. Cl.$^4$ .......................... E03C 1/04; F16K 24/02
[52] U.S. Cl. ............................................. 4/192; 4/191; 4/195
[58] Field of Search ..................... 4/192, 195, 191, 661

[56] References Cited

U.S. PATENT DOCUMENTS

| 1,532,433 | 4/1925 | Mueller | 4/192 |
| 1,595,311 | 8/1926 | Mueller | 4/192 |
| 2,173,064 | 9/1939 | Judell | 4/192 |
| 2,903,710 | 9/1959 | Pearson | 4/192 |
| 3,056,418 | 10/1962 | Adams et al. | 137/217 X |
| 3,286,721 | 11/1966 | Cravits | 137/218 |
| 4,189,792 | 2/1980 | Veach | 4/192 |
| 4,696,322 | 9/1987 | Knapp et al. | 137/218 |

Primary Examiner—Henry J. Recla
Attorney, Agent, or Firm—Herbert Dubno; Ronald Lianides

[57] ABSTRACT

A faucet for mixing hot and cold water especially for a wash fixture, wash bowl or the like comprises a faucet housing connectable to hot and cold water supply pipes having a mixing or outlet chamber which is connected with a water outlet piece which is a withdrawable shower hose outlet. An aerating device responding to low pressure in the chamber which prevents a reverse suction of dirty water by the faucet is integrated in the faucet housing with the mixing or outlet chamber connected with it. This aerating device at least comprises one closure member pressed at least by the force of gravity into the closed position. The weight of the closure member is so chosen that the closure member is drawn into the open position with a lower pressure in the mixing or outlet chamber and communicates between the mixing or outlet chamber and/or the supply pipes and the atmosphere to supply air to the system.

14 Claims, 3 Drawing Sheets

MIXING FIXTURE FOR FLEXIBLE-PIPE SPRAY HEAD

FIELD OF THE INVENTION

Our present invention relates to a mixing valve for mixing hot and cold water and controlling its flow to a flexible-pipe spray head or sprinkler, especially for a rinsing table.

BACKGROUND OF THE INVENTION

A mixing valve for mixing hot and cold water can deliver a tempered water mixture to a flexible-pipe spray head or sprinkler for a rinsing table or the like and comprises a valve housing connectable to hot and cold water supply pipes having a mixing or outlet chamber which is connected with a water outlet piece which is a withdrawable sprinkler hose with a sprinkler head or spray head from which the water is discharged.

A mixing fixture of this type is known to us to have been in use. It has the disadvantage that when the supply of water is interrupted, the pressure in the supply pipes drops and a reverse flow by suction can develop. If during the reverse-flow period the sprinkler hose outlet is put down in the basin, dirty water can be drawn through the hose by the vacuum or suction and can reach the water supply pipes.

This is unhygienic. Of course it is already known to connect a vent valve in the vicinity of a water outlet in certain water fixtures. Arrangements of this latter type are however not significant for a faucet with a withdrawable sprinkler hose outlet.

OBJECTS OF THE INVENTION

It is an object of our invention to provide an improved mixing-valve fixture for mixing hot and cold waters with a sprayhead or sprinkler hose outlet which avoids the aforementioned drawbacks.

It is another object of our invention to provide an improved mixing-valve fixture for mixing hot and cold waters with a sprayhead or sprinkler hose outlet in which a flow-reversing suction is never developed and dirty water is never drawn into the mixing-valve fixture.

SUMMARY OF THE INVENTION

These objects and others which will become more readily apparent hereinafter are attained in accordance with our invention in a mixing-valve fixture for mixing hot and cold water which delivers a tempered water mixture especially for a sprinkler table or basin comprising a mixing-valve fixture housing connectable to hot and cold water supply pipes having a mixing or outlet chamber which is connected with a water outlet member which is a withdrawable sprayhead or sprinkler hose outlet.

According to our invention a venting device responding to a negative pressure or suction is integrated in the mixing-valve fixture housing and connected with the mixing or outlet chamber. This venting device comprises one closure member pressed at least by gravity into a closed position. The weight of the closure member is so chosen that the closure member is drawn into an open position under a negative pressure or suction in the mixing or outlet chamber and a connection is made between the atmosphere and the mixing or outlet chamber to vent a point between the water feed and the downstream water system, i.e. the flexible pipe and the sprinkler head.

The venting device advantageously is a nonreturn valve held in a coaxial sleeve and the coaxial sleeve can be mounted in an upright position in a substantially vertical receptacle in the mixing-valve fixture housing. In mixing-valve fixtures with a sprayhead or sprinkler hose connection and substantially vertical receptacle is advantageously placed from 3 to 5 cm above the highest possible dirty water level in the wash fixture, wash basin or the like. The sleeve and a guide piece positioned in the sleeve for the closure member can be composed of plastic, while the closure member with a guide spindle and any addition weight used therefor can be made from brass. The closure member can contact a circular shoulder of the sleeve which acts as a stop in the closed position while sealing in the closed position can be effected between an O-ring held in a circular groove formed interiorly in the closure member and a stepped passage in the sleeve.

Advantageously, a portion of the guide spindle is surrounded by the;

Advantageously in the vicinity of the guide spindle the guide piece and a ringlike weight composed of brass which can be mounted on the closure member in a press fit and together with the O-ring held in the circular groove act to keep the closure member sealed. The weight and the guide piece are part of a structural unit comprising the venting device. The structural unit is sealed with another O-ring positioned on the exterior surface of the sleeve and axially secured in the receptacle by a spring ring insertable in the receptacle.

The air passage in the sleeve in the vicinity of the closure member can have a diameter of about 9 mm. The stepped passage can have a conical step on which the O-ring held in the circular groove interiorly in the closure member contacts on sealing.

With the above features of our invention an extraordinarily easy response and thus rapid venting of the valve and/or the mixing or outlet chamber occurs since the venting device opens as soon as the the system is under a negative pressure or suction of or vacuum of 3 to 5 cm of water.

When that happens a flow of air from the atmosphere occurs and enters the junction between the water supply system and the outlet tube or pipe to equalize the pressure. The residual suction pressure on the sprayhead or sprinkler outlet in this condition does not exceed the siphon height of the valve.

The venting device advantageously is a structural unit which easily fits in a receptacle in the mixing-valve fixture housing and is easily interchangeable. For this purpose the venting device can be operated in a reverse direction, positioned vertically and formed by a commercial back flow preventor of the nominal size 15. Among other things a modified sealing cone without spring bias can be used. The geometry of the sealing cone can be optimized from the point of view of flow engineering so that during water flow a water-side seal against the atmosphere is guaranteed and during operation of the venting mechanism a sufficient volume of flow of air is guaranteed.

The venting device comprising the structural unit can be harmoniously integrated into the mixing-valve fixture and can vent both cold and warm water. There is no impairment of water flow in the mixing-valve fixture because of the venting device.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
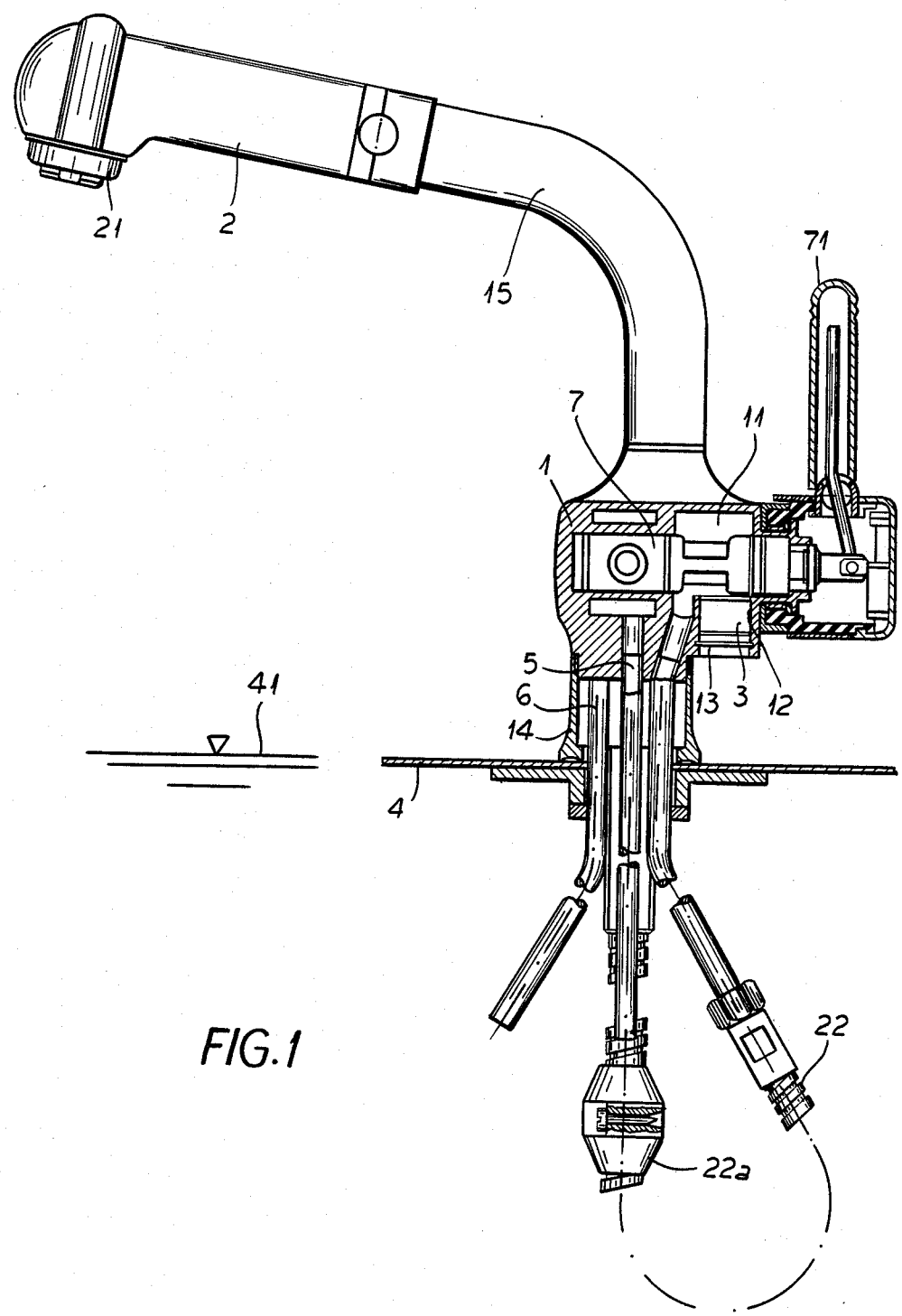
FIG. 1 is a partially side elevational, partially cross sectional view of a mixing-valve fixture with a sprayhead or sprinkler hose outlet according to our invention.

The mixing-valve fixture shown in the drawing is attached to an only partially shown rinsing table 4 and connected to the supply pipes 5, 6 for cold and hot water.

The mixing-valve fixture is mounted on a base 14 attached to the mixing-valve fixture housing 1 on the wash fixture 4.

A cartridge-type mixing and flow regulating valve 7 is mounted in the mixing-valve fixture body. This valve is operable with a handle 71. The total flow rate of the water flowing through the mixing-valve fixture can be set with the handle 71 by a motion about an axes defining a first degree of freedom and the mixing proportions of the cold and warm water can be set by a motion about an axis defining a second degree of freedom.

Downstream of the cartridge 7 a mixing or outlet chamber 11 is provided in the mixing-valve fixture housing 1.

The mixing or outlet chamber 11 is connected with a water outlet member 2, which contains is the sprayhead or sprinkler hose outlet 21, by a hose 22 and also is connected to the atmosphere by a venting device 3.

In the water displacing process the mixed water produced in the mixing-valve fixture flows from the mixing or outlet chamber 11 through the hose 22 through the water outlet member 2 to a sprinkler head 21 and issues there as a free stream.

Figure 4:
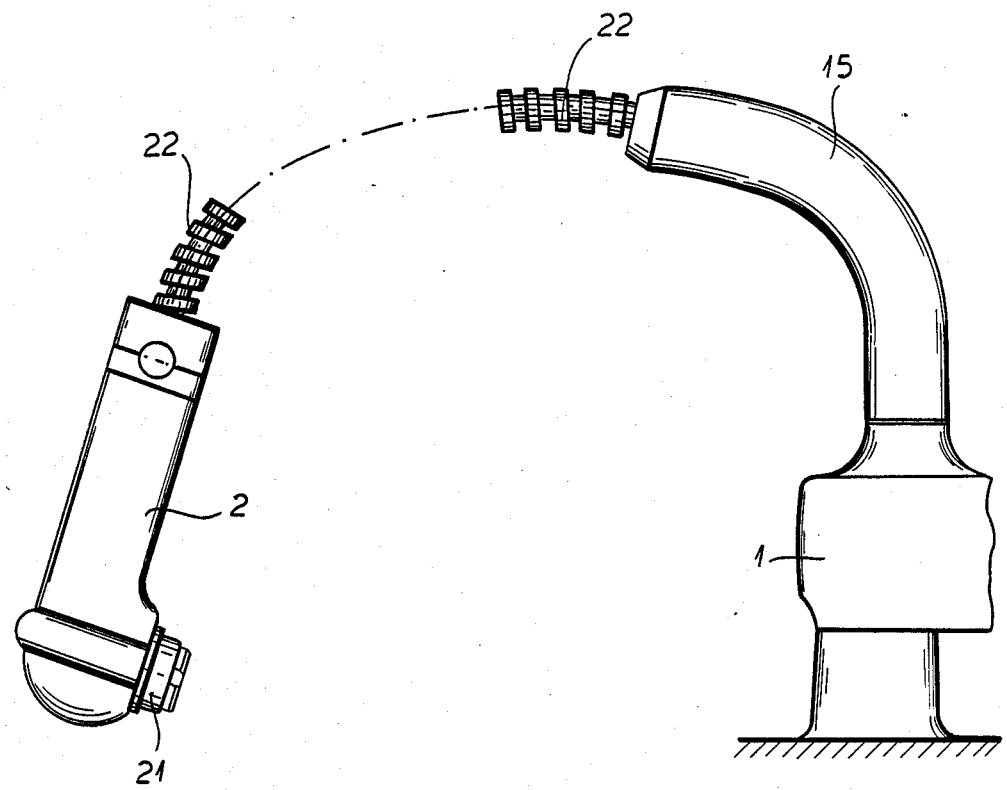
FIG. 4 is an elevational view similar to FIG. 1 showing the spray or sprinkler head withdrawn from its holder.

The water outlet member 2 with sprayhead or sprinkler hose outlet 21, is held by a pipe 15 which is swingable on the housing 1. The hose 22, pulled downwardly by weight 22a, is guided through the pipe 15 so that the water outlet member 2 with the hose 22 can be pulled out of the mixing-valve fixture as required (see FIG. 4).

Figure 2:
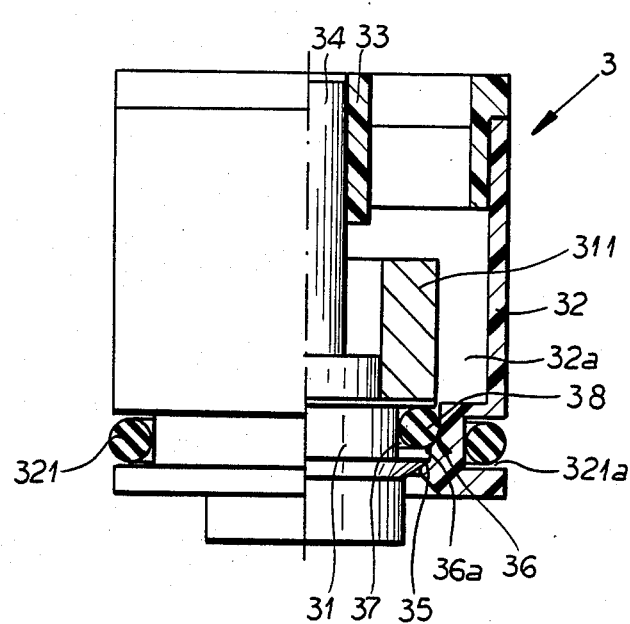
FIG. 2 is a partially side elevational, partially cross sectional view of an enlarged venting device used in the fixture of FIG. 1.
Figure 3:
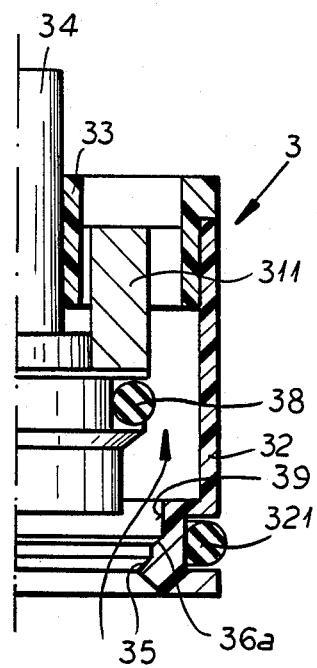
FIG. 3 is a fragmentary view of the venting device in its venting position.

The venting device 3 is a structural unit in a receptacle 12 which communicates between the mixing and outlet chamber 11 and the atmosphere. As seen from FIG. 2 the venting device 3 is positioned in a sleeve 32 which is pushed into the receptacle 12 and can be secured with a spring ring 13 in the inserted position.

An O-ring 321 is mounted on the outer jacket of the sleeve 32 as a seal.

A closure member 31 with a guide spindle 34 slidable axially is positioned in a guide piece 33 held in the sleeve 32 in a press fit. In the closed position (FIG. 2) the closure member 31 contacts on a circular beveled shoulder 35 of the sleeve 32 acting as a stop. For a good seal an O-ring 38 is held in a circular groove 37 of the closure member 31 in contact with a stepped passage 36 of the sleeve 32. The stepped passage 36 has a conical step 36a on which the O-ring 38 contacts on sealing. Thus a comparatively low friction sliding of the closure member 31 is possible.

A weight 311 which is a brass ring is held in a press fit on the closure member 31 above the O-ring 38.

The sleeve 32 and the guide piece 33 can advantageously be made from plastic and joined together in a press fit.

The venting device 3 can be assembled as a structural unit. First the closure member 31 is provided with the O-ring 38 and the weight 311 and after that this part is inserted in the sleeve 32. Then the guide piece 33 receiving the guide spindle 34 is pressed in the sleeve 32. After that the O-ring 321 need only be pressed in the groove 321a in the outer jacket surface.

The assembled structural unit can now be completely pushed in the vertically oriented receiving passage 12 and secured with the spring ring 13.

With a negative or suction pressure of 3 to 5 cm (water column) in the mixing or outlet chamber 11 the venting device 3 opens, as could be confirmed by experiment, and that results in a volume flow of atmospheric air through the passage 32a of the sleeve 32 when the O-ring 38 is lifted from seat 36a so that the vacuum is broken in the connected pipe network. Since the mixing-valve fixture housing 1 is found at least 3 to 5 cm above the rinsing table 4 and the highest possible dirty water level 41 is determined by the upper edge of the rinsing table 4, drawing of dirty water through the sprayhead or sprinkler hose outlet 21, should the latter be in the rinse water, is prevented.

When the air flow opening 39 in the sleeve 32 in the vicinity of the closure member 31 has a diameter of approximately 9 mm, an advantageous dimensioning of the sleeve 32 with good venting conditions can be attained.

In the example shown above a hand-held sprinkler with a stand and a fixed valve are illustrated. Understandably the venting device according to our invention can be used in other mixing-valve fixtures. It only need be guaranteed that a vertical receptacle be provided and the venting device be positioned at least 3 to 5 cm above the highest possible dirty water level.

We claim:

1. In a mixing-valve fixture for mixing hot and cold water which delivers a tempered water mixture especially for a rinsing table or basin comprising a mixing-valve fixture housing connectable to hot and cold water supply pipes and having a mixing or outlet chamber which is connected with a water outlet member which is a withdrawable sprayhead or sprinkler hose outlet, the improvement comprising a venting device responsive to a negative pressure or suction integrated in said mixing-valve fixture housing with said mixing or outlet chamber connected to said venting device, which comprises a weighted closure member pressable at least by gravity into a closed position, the weight of said closure member being so chosen that said closure member is drawn into an open position under a negative pressure or suction in said mixing or outlet chamber whereby a communication between the atmosphere and said mixing or outlet chamber is established for preventing the drawing of dirty water through said spray head or sprinkler hose outlet from said rinsing table.

2. The improvement according to claim 1 wherein said venting device comprises a nonreturn valve held in a coaxial sleeve, said coaxial sleeve being mounted in an upright position in a substantially vertical receptacle in said mixing-valve fixture housing.

3. The improvement according to claim 2 wherein said substantially vertical receptacle is located from 3 to 5 cm above the highest possible dirty water level in said rinsing table or basin.

4. The improvement according to claim 2 wherein said sleeve and a guide piece positioned in said sleeve for said closure member are composed of plastic, while said closure member with a guide spindle slidable in said guide piece is made from brass.

5. The improvement according to claim 4 wherein said closure member contacts a circular shoulder formed in said sleeve which acts as a stop in said closed position while sealing in said closed position occurs between an O-ring held in a circular groove formed interiorly in said closure member and a stepped passage formed in said sleeve.

6. The improvement according to claim 5 wherein surrounding at least a portion of said guide spindle and spaced therefrom a ring-like weight composed of brass is mounted on said closure member in a press fit and said guide piece is mounted in said sleeve in a press fit and together with said O-ring held in said circular groove, said weight and said guide piece form a part of the structural unit which is said venting device, said structural unit being sealed with a second O-ring positioned on the exterior surface of said sleeve and axially secured in said receptacle by a spring ring insertable in said receptacle.

7. The improvement according to claim 6 wherein said stepped passage forms with said closure member in the open position thereof an air passage having a diameter of about 9 mm and said stepped passage is provided with a conical step against which said first O-ring of said closure member contacts on sealing in the closed position thereof.

8. A mixing-valve fixture for mixing hot and cold water which delivers a tempered water mixture especially for a rinsing table or basin comprising:
- a mixing-valve fixture housing having a mixing or outlet chamber;
- a hot and a cold water supply pipe connected to said mixing or outlet chamber in said mixing-valve fixture housing;
- a water outlet member which is a withdrawable sprayhead or sprinkler hose outlet connected to said mixing or outlet chamber; and
- a venting device responding to a negative pressure or suction integrated in said mixing-valve fixture housing with said mixing or outlet chamber connected to said venting device which at least comprises one closure member pressable at least by gravity into a closed position, the weight of said closure member being so chosen that said closure member is drawn into an open position under a negative pressure or suction whereby a communication between the atmosphere and said mixing or outlet chamber and/or said hot and cold water supply pipes is established for providing air.

9. A mixing-valve fixture according to claim 8 wherein said venting device further comprises:
- a coaxial sleeve mounted in an upright position in a substantially vertical receptacle formed in said mixing-valve fixture housing, with a circular shoulder formed in said sleeve on which said closure member contacts in said closed position;
- a guide piece composed of plastic positioned in said sleeve and slidably receiving a guide spindle composed of brass and attached to said closure member which is also composed of brass;
- a first O-ring held in a circular groove formed interiorly in said closure member and disposed coaxially in a stepped passage with a conical step formed in said sleeve and contacted by said first O-ring for sealing in said closed position; and
- a ring-like weight composed of brass mounted surrounding said guide spindle on said closure member in a press fit therewith while said guide piece is also mounted in said sleeve in a press fit and together with said first O-ring, said weight and said guide piece, forming a part of the structural unit defining said venting device, said structural unit being sealed with a second O-ring positioned on the exterior surface of said sleeve and axially secured in said receptacle by a spring ring insertable therein.

10. A rinsing table fixture, comprising:
- a base mounted on a rinsing table; and
- a mixing valve mounted on said base, said mixing valve comprising:
- a valve housing forming a mixing chamber,
- a hot water inlet, and
- a cold water inlet,
- a valve assembly connected between said inlets and said chamber for mixing hot and cold water and controlling a flow of water through said mixing valve;
- a flexible outlet hose connected with said chamber for delivering said flow of water;
- a sprinkler head at an end of said flexible outlet hose for receiving said flow of water from said outlet hose and discharging said flow; and
- a vent valve in said housing communicating between the atmosphere and said chamber effective upon the development of a slight suction in said chamber to vent said chamber to the atmosphere and prevent water from being drawn back through said flexible hose, and blocking communication with the atmosphere upon operation of said mixing valve to feed water through said flexible hose to said sprinkler head, said housing being formed with a vertical bore and said vent valve including
- an annular guide received in said bore and formed with a seat,
- a valve member biased by gravity against said seat but vertically shiftable in said guide under said slight suction to lift said valve member from said seat, and
- means for sealing said member with respect to said guide and said guide with respect to said bore.

11. The fixture defined in claim 10 wherein said means for sealing includes an O-ring between said member and said guide and another O-ring between said guide and said housing.

12. The fixture defined in claim 11 wherein said member is formed with a shank surrounded by a brass ring constituting a weight biasing said member toward said seat.

13. The fixture defined in claim 12 wherein said housing is provided with a pipe extending upwardly from said housing and formed with a bend, said pipe being swivelably mounted on said housing and guiding said hose, said head being removably mountable on said pipe.

14. The fixture defined in claim 13 wherein said hose is provided with a weight below said housing to retract said hose through said pipe when said head is mounted on said pipe.

* * * * *